US006658494B2

(12) United States Patent
Meyer et al.

(10) Patent No.: US 6,658,494 B2
(45) Date of Patent: Dec. 2, 2003

(54) ROUTER TOPOLOGY HAVING N ON 1 REDUNDANCY

(75) Inventors: Charles S. Meyer, Nevada City, CA (US); Donald S. Lydon, Nevada City, CA (US); Robert W. Hudelson, Grass Valley, CA (US)

(73) Assignee: NVision, Inc., Grass Valley, CA (US)

( * ) Notice: Subject to any disclaimer, the term of this patent is extended or adjusted under 35 U.S.C. 154(b) by 386 days.

(21) Appl. No.: 09/839,571

(22) Filed: Apr. 20, 2001

(65) Prior Publication Data

US 2002/0156940 A1 Oct. 24, 2002

(51) Int. Cl.[7] .......................... G06F 13/00; G06F 13/20
(52) U.S. Cl. .................. 710/2; 714/1; 714/2; 370/389; 370/401; 370/412
(58) Field of Search .......................... 710/2; 714/1, 2; 370/389, 401, 412

(56) References Cited

U.S. PATENT DOCUMENTS

| 4,197,523 | A |   | 4/1980  | Philip et al.     |         |
|-----------|---|---|---------|-------------------|---------|
| 4,402,074 | A |   | 8/1983  | Cupuis et al.     |         |
| 4,485,467 | A |   | 11/1984 | Miles et al.      |         |
| 5,754,118 | A |   | 5/1998  | Brunner           |         |
| 5,818,349 | A |   | 10/1998 | Dayton            |         |
| 5,982,744 | A |   | 11/1999 | Cantwell et al.   |         |
| 6,430,179 | B1| * | 8/2002  | Meyer             | 370/360 |
| 6,452,945 | B1| * | 9/2002  | Upham et al.      | 370/480 |
| 6,556,547 | B1| * | 4/2003  | Srikanth et al.   | 370/317 |
| 6,563,831 | B1| * | 5/2003  | Dally et al.      | 370/401 |
| 6,581,153 | B1| * | 6/2003  | Matt et al.       | 712/35  |

OTHER PUBLICATIONS

Rigby, P., "AMCC Raises Eyebrows",http://www.lightreading.com, 2 pgs. (Jan. 22, 2002).
Rigby, P., "Vitesse's Balancing Act", http://www.lightreading.com, 2 pgs. (May 7, 2001).

* cited by examiner

Primary Examiner—Rehana Perveen
(74) Attorney, Agent, or Firm—Smith-Hill and Bedell

(57) ABSTRACT

A router that utilizes one additional crosspoint module to provide backup to N crosspoint modules. The redundant crosspoint module receives every input from P input modules and provides O/N outputs to M output modules. Each of the M output modules receives an output from a particular N crosspoint module and a corresponding O/M output from the redundant crosspoint module. Each output module has logic to determine whether the output module should select the output from a particular N crosspoint module or the output of the redundant crosspoint module.

29 Claims, 8 Drawing Sheets

ROUTER TOPOLOGY HAVING N ON 1 REDUNDANCY

FIELD OF THE INVENTION

The present invention is directed to a router topology having redundancy, and, more particularly, a router topology that decreases the number of outputs affected in the event of any single point failure in a crosspoint or crossbar module.

BACKGROUND OF THE INVENTION

Circuit switching has long been used to permit the shared use of various resources, such as cameras, tape recorders, disk storage, or special effects generators, among a number of users. Other equipment may also be connected with switched circuits in order to produce and distribute the necessary signals associated with broadcasting a television signal, producing a movie, developing a commercial, or other similar activities. The majority of circuit switching is carried out with crosspoint or crossbar matrices similar to those used by telecommunications providers for connecting telephone calls, or switching higher bandwidth consolidated telephone signals.

In a broadcast facility, it is very important that "on-air" signals do not fail. Traditionally, in order to reach this goal, a router system had to be fully redundant. FIG. 1 illustrates a redundant router system according to the prior art. The router system 10 is an M input by N output router. It is actually configured as two M by N routers 12, followed by N, 2 input by 1 output switches 14. The corresponding input of each router 12 is fed the same signal, and the N outputs are likewise connected in corresponding order to the N, 2×1 switches 14. An input distribution component formed by fan-out amplifiers 16 is used to distribute each input to each M×N switch 12. Within each router 12 there may be multiple crosspoint or crossbar matrices, input modules, and output modules in any of a number of known configurations providing the necessary switch dimensions. The switch 12 can also be used with port oriented routers whereby input-output circuit pairs share a common connector and port interface to the switch without any loss of generality. The output switches 14 normally select outputs from only one of the routers 12 to appear at their respective outputs, however, if there is a failure in the router the output switches 14 are receiving signals from, the output switches 14 select output signals from the alternate router 12 to appear at their respective outputs.

An assumption is made that the 2×1 switches 14 are simpler than the M×N switches 12 and therefore more reliable. In addition, the 2×1 switches 14 are individually repairable and in no way interrelated to each other. Therefore, a single failure in the system will affect at most a single output.

As the size of the M×N core has grown larger and larger, the topology shown in FIG. 1 becomes too complicated, large and expensive. For telecommunications purposes, the M×N core can be blocking, i.e., there are not enough crosspoint elements to guarantee that every input may be connected to at least one output at any given instant. In addition, such a switch also does not need to be able to couple any input to any subset of outputs, including all or some of the available outputs. Therefore, in order to save crosspoints and cost, these routers have become multistage matrices of 3 or more layers. Broadcast applications still demand a non-blocking structure where any input may be connected to any single output, group of outputs, or every output, and so the geometric growth in crosspoint cost and size has contributed to the decline of the approach shown in FIG. 1.

Since fully redundant routers are space and cost prohibitive, and recognizing that routers are made of a number of modules for inputs, outputs and crosspoints, many broadcast and telecommunications installations are designed so that the effect of a single card failure is minimized without backup. For example, a broadcast facility may have a master control studio responsible for the last switching and production details of a television program prior to broadcast. This studio could have 4 unique signals from which to choose. If all of these signals were on a single input or output card in the switch matrix, and that single card failed, there would be nothing available to broadcast on air. However, if the 4 inputs were distributed such that each input was on a separate module and likewise each output was on a separate module, then should any one module fail, there would still be 3 signals left for the master control studio. While such a technique is not ideal, it is satisfactory and requires no additional router frames or modules. How well this approach works is based on the number of inputs and outputs, or ports if a port oriented router is used to distribute inputs and outputs, implemented on a given assembly. This number can be as small as 2 and as large as 32 in contemporary router designs.

One limitation with this approach, is that crosspoint technology has become very dense with thousands of crosspoints implemented in a single chip. In order to minimize total system size and cost, crosspoint building blocks of 128×32 and 256×64 are common in today's routers. Once crosspoint cards are this big, there may only be two or three in an entire system, therefore the impact block is substantial if a crosspoint card should fail. This limits the utility of the aforementioned approach to minimize failure impact without paying for full backup redundancy. For most systems, an empirical limit of 8 or 16 is considered to be the maximum allowable impact block size.

In other types of systems, an approach called N on 1 redundancy has become popular. A computer memory system uses this approach. In a simple example, two separate hard drives are required for caching and storing intermediate data so that a given software algorithm can execute correctly. In a classic scenario, two drives would be needed to back this system up in case of failure of either drive. However, if the drives could share common data input and output busses, then one drive could be used to back up either of the other two. There is now the need to be able to intelligently assign the standby drive to the address space of either primary drive. This is easily accomplished with some additional hardware and software. While backing up disk drives at a ratio of 2 to 1 is probably not very cost effective, there are many examples today where the backup ratio is much larger, i.e., 10 or 25 to 1. In these cases, the use of 1 disk, rather than 10 or 25, is very cost effective especially provided the application requires only a statistically small loss, rather than an absolute guarantee of zero loss.

There is thus a need for a simple compact and cost effective system that provides the necessary redundancy for broadcast routers.

SUMMARY OF THE INVENTION

According to a first aspect of the invention, there is provided a router having I inputs and O outputs. The router includes P input modules, N crosspoint modules, a redundant crosspoint module and M output modules. Each input module receives I/P of I inputs. Each crosspoint module receives I inputs and outputs O/N outputs per module and the redundant crosspoint module which receives I inputs and outputs O/N outputs. Each output module receives O/N outputs per module from a particular N crosspoint module and a corresponding O/N outputs from the redundant module. According to a second aspect of the present invention, there is provided router having I inputs and O outputs. The router includes N crosspoint modules, P input module. According to a crosspoint module and M output modules. Each of the N crosspoint modules has I inputs and O/N outputs. Each input module has I/P inputs and I/P outputs wherein each output of each input module is coupled to a unique input of each of N crosspoint modules so that an input received by any of P input modules in propagated to each of N crosspoint modules. Each output module has a first set of O/M inputs, and a second set of O/M inputs and O/M outputs wherein the M output modules are arranged in N groups of M/N output modules and wherein the outputs of each of the N crosspoint modules is coupled in a one-to-one, known order to the first set of O/M inputs of the M/N output modules of a unique one of the N groups of output modules. The redundant crosspoint module has I inputs coupled in a one-to-one manner to the I/P outputs of each of the P input modules, the redundant crosspoint module having O/N outputs coupled to the second set of O/M inputs of the M/N output modules of each of the N groups of output modules in a one-to-one, known order wherein the order of the connections between the outputs of the redundant crosspoint module within a particular group are identical to the connection between that particular group and its associated one of N crosspoint modules so that each group of output modules receives an output from one of the N crosspoint modules and an output from the redundant module. According to a third aspect of the present invention, there is provided a router having I inputs and O outputs. The router includes N crosspoint modules, a redundant crosspoint module, and P port modules. Each port module receives I/P inputs and propagates said inputs identically to corresponding inputs on each of N crosspoint modules and redundant crosspoint module and each port module receives O/P unique inputs from one of N crosspoint modules in a known order, and also receives O/P inputs identically with N-1 other port modules from the redundant crosspoint module in an identical known order. According to a fourth aspect of the present invention, there is provided a method of providing redundancy to a router having I inputs and O outputs. The method includes the steps of: (a) detecting a failure in a crosspoint module supplying an output to an output module; (b) switching between an output provided to the output module from the crosspoint detected in step (a) to a redundant crosspoint module, wherein the redundant crosspoint module is coupled to the output module in an identical order to that of the crosspoint module detected in step (a); (c) detecting a condition to switch back to the crosspoint detected in step (a); and (d) switching back to the crosspoint detected in step (a) only after a first condition is detected by the router. According to a fifth aspect of the present invention, there is provided a method of providing redundancy to a router having I inputs and O outputs. The method includes the steps of:

(a) monitoring a status of every crosspoint module in the router; (b) detecting a failure in one of the crosspoint module supplying an output to an output module; (c) switching between an output provided to the output module from the crosspoint detected in step (b) to a redundant crosspoint module, wherein the redundant crosspoint module is coupled to the output module in an identical order to that of the crosspoint module detected in step (b); (d) detecting a condition to switch back to the crosspoint detected in step (b); (e) switching back to the crosspoint detected in step (b) only after a first condition is detected by the router; (f) ignoring any subsequent failure in any of the crosspoint modules after step (a) until step (e) is performed.

BRIEF DESCRIPTION OF THE DRAWINGS

The invention may be more completely understood by considering the detailed description of various embodiments of the invention which follows in connection with the accompanying drawings.

DETAILED DESCRIPTION OF THE PREFERRED EMBODIMENTS OF THE PRESENT INVENTION

Figure 1:
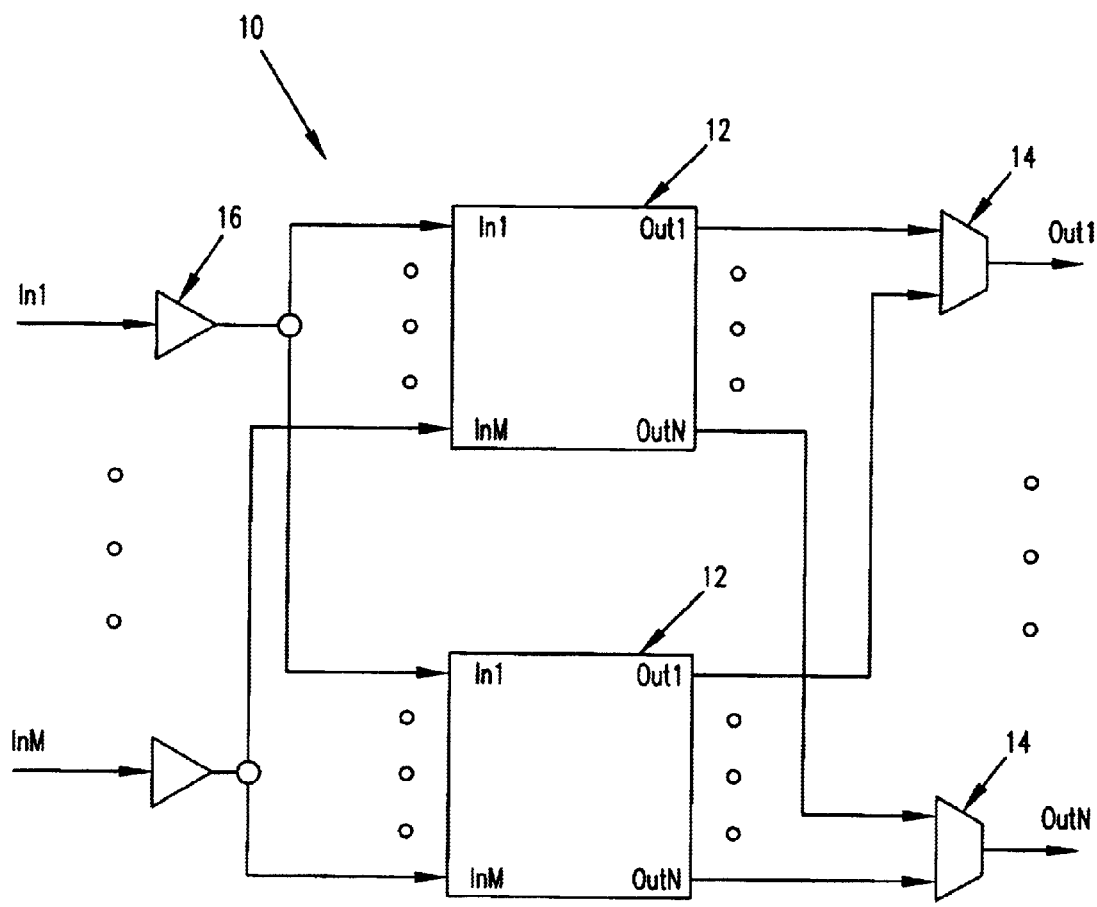
FIG. 1 is a schematic of a redundant router according to the prior art.
Figure 2:
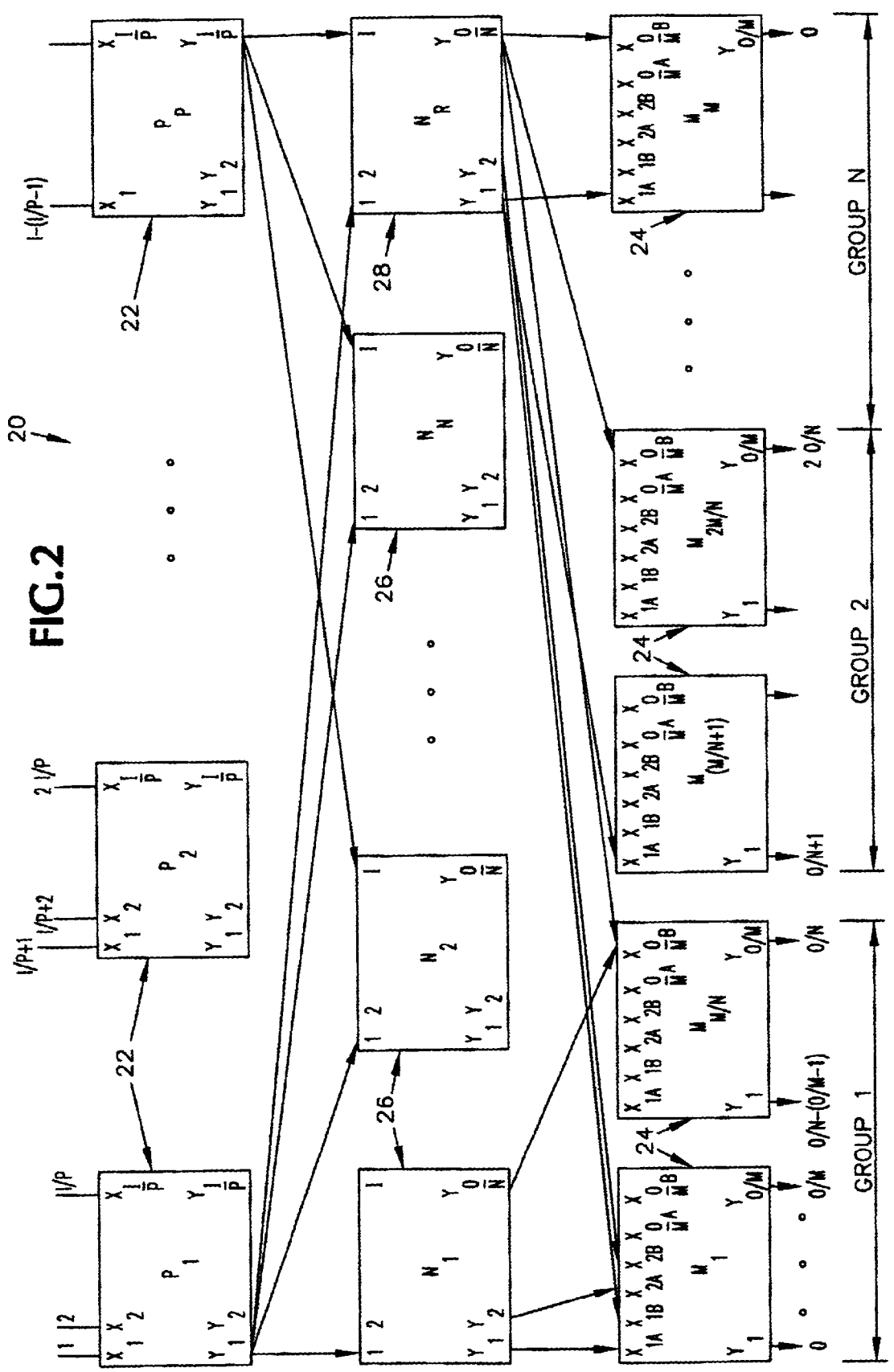
FIG. 2 is a schematic of a redundant router according to a preferred embodiment of the present invention.

FIG. 2 is a schematic of a redundant router according to a preferred embodiment of the present invention. The router 20 includes a plurality, P, of input modules 22, a plurality, M, of output modules 24, and a plurality N, of crosspoint modules 26, and a redundant crosspoint module 28. Alternatively, if P=M, the corresponding input and output modules 22, 24 may be combined in a single module (see FIG. 7) This is commonly referred to as a port oriented router. An example of such a port oriented router can be found in U.S. Pat. No. 5,396,512 which is incorporated herein by reference. Because modules are used, a router in an existing facility can be designed, as will be described with reference to FIG. 6, by placing the modules in a chassis, mounted in equipment racks and the router can be expanded by simply adding modules to the chassis.

The redundant crosspoint module 28 is added to a router having N crosspoint modules 26 within its chassis, where N crosspoint modules are necessary and sufficient to provide non-blocking, full broadcast connection capacity between all I inputs and O outputs. The redundant crosspoint module provides redundancy cost effectively while minimizing the space required to implement such redundancy and simultaneously eliminating the crosspoint modules from impact block calculations. Impact block requirements can be met by purposely selecting the number of input/output modules or port oriented routers so that failure points can be precisely designated.

In the preferred embodiment shown in FIG. 2 the router 20 has I inputs and O outputs. An example will be described using concrete numbers. Of course, those of ordinary skill in the art will appreciate that the preferred embodiments of the present invention are not limited to this particular example and routers of other dimensions are encompassed. In a preferred embodiment, I=O=128 so the router 20 is a 128 by 128 router. The inputs, I, are divided amongst the plurality, P, of input modules 22. In a preferred embodiment, P=8 so each module receives 16 inputs. Each input module has I/P outputs, i.e. 16 outputs in the particular example described. The input modules 22 may process the inputs to improve the signal's integrity and essentially match the electrical characteristics of the physical medium of the incoming signals to that of the router 20. Each output of each input module 22 is coupled to a unique input of each N crosspoint module 26 and the redundant crosspoint module 28 so that each input I to each input module 22 is distributed in a one-to-one, known order to a unique input of each of the crosspoint modules 26. The distribution can be point-to-point, as shown, or bussed. If the distribution is point-to-point, then the input modules 22 include fan out buffers (not shown) to distribute its outputs to the crosspoint modules 26 and redundant crosspoint module 28.

Each of the N crosspoint modules 26 has I inputs and O/N outputs. In the example being used, N<4, so each crosspoint module is thus a 128 by 32 crosspoint module. The outputs of each input module may be coupled to the crosspoint modules 26 and redundant crosspoint module 28 in a non-identical fashion. For example, the first input module 22 may have its outputs coupled sequentially to sequential inputs of its associated crosspoint module 26 and redundant crosspoint module 28, whereas, the next input module may have its outputs coupled non-sequentially to the inputs of its respective crosspoint module 26 and redundant crosspoint module 28. Such a coupling is determined by the design of the chassis, and may occur in order to minimize the number of layers in the motherboard connecting the modules, for example The important factor is that the order of the coupling be in a known order to the crosspoint modules and redundant crosspoint module 28. The crosspoint modules may be provided with software to remap the connections as is well known to those of ordinary skill in the art.

In a preferred embodiment there are an equal number, M, of output modules as input modules, thus M=8. The output modules 24 are grouped into N groups of M/N output modules. In a particular example, there are four groups of two output modules 24. Each of the N crosspoint modules 26 has its outputs coupled in a one-to-one known order to the inputs of a unique one of the N groups of output modules 24. As illustrated, the first crosspoint module 26 has its outputs coupled to the output modules in group one. Alternatively, if the output modules are provided with enough inputs and outputs, a unique one of the N crosspoint modules 26 may be associated with a unique one of the output modules 24.

In a preferred embodiment, the redundant crosspoint module 28 has I inputs and O/N outputs. The redundant crosspoint module 28 receives every output from every input module 22. The outputs of the redundant crosspoint module are connected differently from the N crosspoint modules 26. In a preferred embodiment, each output of the redundant crosspoint module is coupled in a one-to-one, known order to a unique input of each group of output modules 24. The connections between the particular outputs of the redundant crosspoint module 28 and the crosspoint module 26 associated with the particular output module are mapped identically. Thus, each group of output modules receives an output from one of the N crosspoint modules 26 and an output from the redundant crosspoint module 28.

If the outputs of the redundant crosspoint module are bussed to the output modules 24, the redundant crosspoint module 28 can be identical to the other crosspoint modules 26. Alternatively, if point-to-point connections are to be made between the redundant crosspoint module 28 and the output modules 24 and the same type of crosspoint module is to be used for all crosspoint modules, a fan out buffer module (not shown) can be inserted between the redundant crosspoint module 28 and the output modules 24. Alternatively, the redundant crosspoint module 28 may be different from the other crosspoint modules 26 where the redundant crosspoint module has fan out buffers (not shown) located in the redundant crosspoint module.

Of course those of ordinary skill in the art will appreciate that the input modules, output modules, crosspoint and redundant crosspoint modules may have other dimensions than the particular example given. For example, the router may be a 256 by 256 router where each crosspoint and redundant crosspoint module has 256 inputs and 128 outputs.

Figure 3:
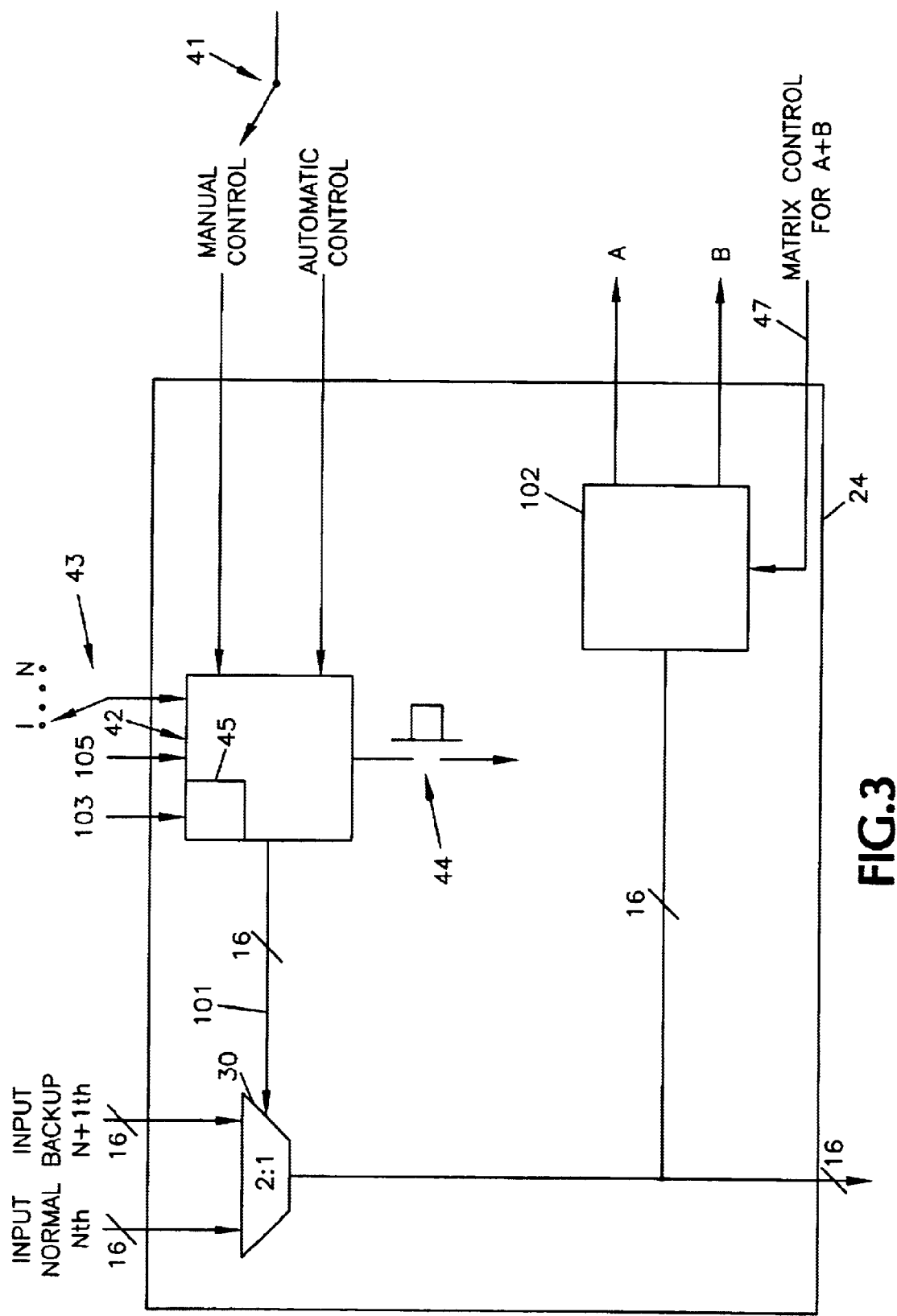
FIG. 3 is a schematic of an output module according to a preferred embodiment of the present invention.

There are various ways of switching between the output provided by one of the crosspoint modules 26 and the redundant module 28. One relatively simple way is shown in FIG. 3. A two position switch 41 is provided to select the option of operating the router 20 in a manual mode or an automatic mode. Such a switch could be installed on an additional module 40, see FIG. 6, installed in the chassis that is electrically coupled to the output modules 24. Alternatively, a connector for switch terminals could be provided on the chassis and the switch could be located elsewhere in the facility.

Each output module 24 has O/M switches 30, a logic circuit 42, reset button 44 and, optionally, a matrix 102. The O/M switches 30 receive outputs from the crosspoint module associated with that particular output module, labeled "input normal", and outputs from the redundant crosspoint module 28 labeled "input backup". The logic circuit 42 receives commands from the switch 41 to place the output module 24 either in manual or automatic mode.

When the router 20 is placed in manual mode and a malfunction occurs with respect to one of the N crosspoint modules 26, an additional switch 43, which can also be located on module 40, is used to control the switch 30, via the select line 101 output by the logic circuit 42, so that the outputs of the redundant crosspoint module 28 are selected rather than those of the failed crosspoint module 26. In a preferred embodiment, the switch 43 is an N position knob, where, in a first position, the switch 43 controls the first group of output modules, in a second position the switch controls the next group of output modules, and so on. Thus, an operator can swap in the redundant crosspoint module for the particular one of N crosspoint modules that failed using the N position knob. N will depend on the number of crosspoint modules used in the router 20.

When the router 20 is placed in automatic mode, each output module 24 has the necessary circuitry to switch between receiving outputs from its associated crosspoint module 26 and the redundant module 28 via select line 101. In particular, the logic circuit 42 monitors a status line 103 from its associated crosspoint module 26 as well as a status line 105 from the redundant crosspoint module 28. If the status line for the Nth crosspoint module 26 is bad and the status from the redundant crosspoint module 28 is good, the logic circuit 42 causes the switches 30 to switch the selected output from the Nth crosspoint module to the redundant crosspoint module. If the status line from the redundant crosspoint module 28 is also bad, then no switching occurs. In addition, it is further preferred that all of the N crosspoint status lines be examined and the logic be implemented such that the first crosspoint to fail gets backed up by the redundant crosspoint module and any other failure on any other crosspoint module will be ignored until such time as the initial failure is serviced and the redundant crosspoint is returned to readiness as will be described.

Once a switch has been made to select the outputs of the redundant crosspoint module 28, however, a switch back to the output modules' associated crosspoint module 26 cannot be made until the reset button 44 has been depressed, which ensures that the failed crosspoint module 26 has been repaired or replaced. In a preferred embodiment, once the reset button 44 has been depressed, the switch back to the Nth crosspoint module does not occur until a predetermined condition is detected in a switch strobe signal distributed to all crosspoint modules, redundant crosspoint module, and output modules. In a preferred embodiment, the predetermined condition is a video vertical interval. This ensures a clean "on air" switch after repair or service of the malfunctioning or damaged crosspoint module. A detector 45 for detecting the status line monitored from each crosspoint and redundant crosspoint module can be as simple as a pull-up resistor that drops to logic 0 when there is a power outage indicating a failure in the crosspoint or redundant crosspoint module.

Each crosspoint module 26 in a preferred embodiment has a unique address that is hardwired in the chassis 30. A controller (51) is located in the chassis 30 and receives a topological map from a host computer (not shown) that defines the coupling of each crosspoint's inputs and outputs as defined by a user. This topological map is broadcast to all crosspoint modules 26 by the controller through a flex line coupled to each crosspoint and redundant crosspoint module as is well known to those of ordinary skill in the art. The redundant crosspoint module 28 is not hardwired in the chassis 30 but is flexible so that it can replace any one of the N crosspoint modules 26 in the chassis 30. Whether the router is in manual or automatic mode, when a switch is made to the redundant crosspoint module 28, the redundant crosspoint module 28 is commanded to take over via asserting the address of the failed crosspoint module on the flex line for a particular failed crosspoint module 26 and is sent the topological map for that failed crosspoint module.

Optionally, matrix 102 may be included in each output module 24 for collecting monitoring information of the output signals of the output modules 24. The matrix 102 is coupled to the outputs of switches 30 and is controlled by a control signal 47 received from the controller of the router 20. The matrix is controlled to output "a" signals which are outputs selected randomly by a user or "b" signals which are all of the outputs sequentially polled both of which will be described in detail with reference to FIG. 4.

Figure 4:
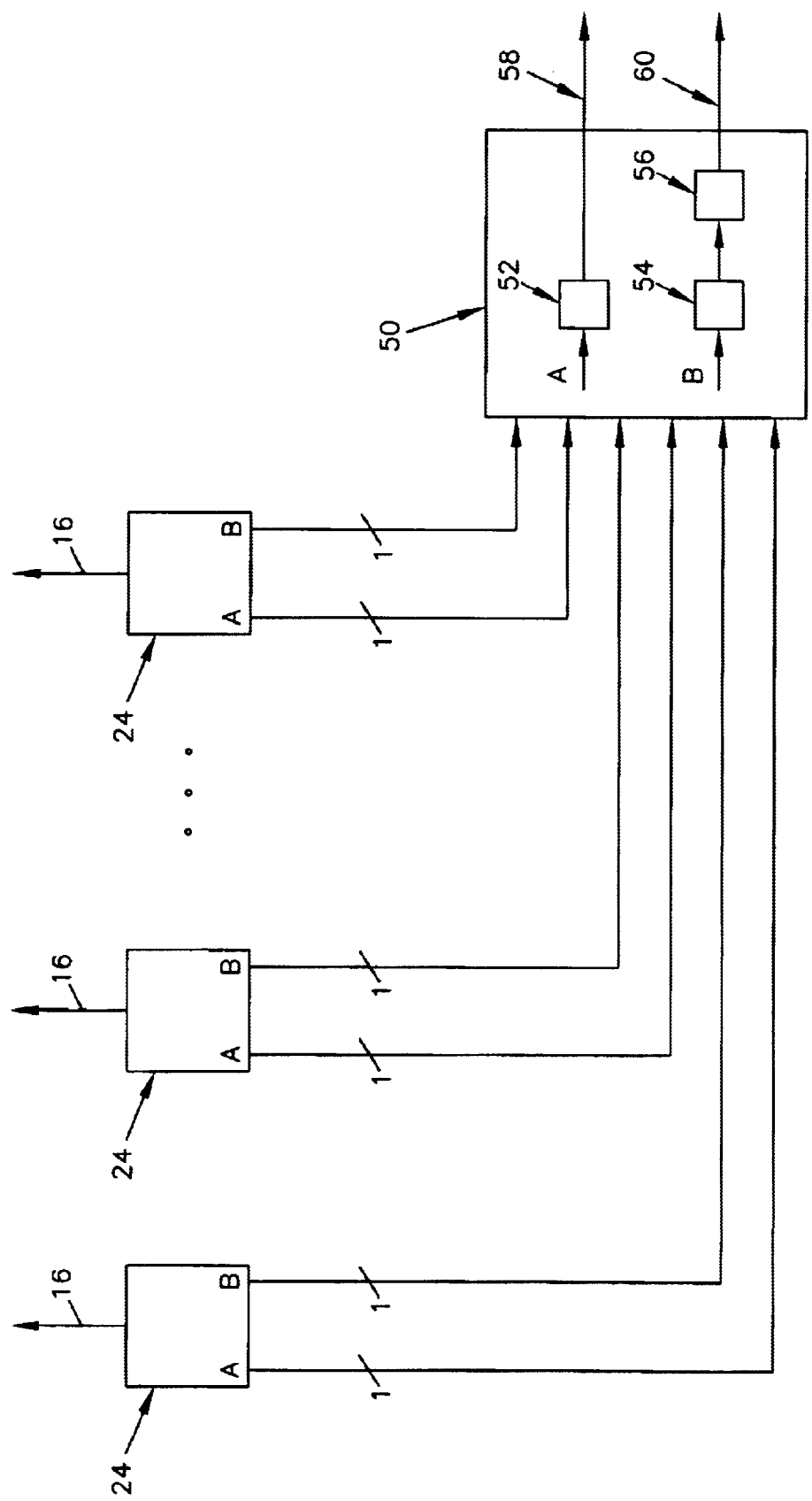
FIG. 4 is a schematic view of a monitoring system according to a preferred embodiment of the present invention.

Another implementation for detecting failure of a crosspoint module and implementing the switch is shown in FIG. 4. A monitor card 50 is provided in the chassis 30. The monitor card 50 is coupled to signals a, b located on each output module 24. The monitor card provides two output signals 58, 60. The outputs 58, 60 can be sent to a quality control room, for example, where an operator can monitor the operation of the router 20. Located on the monitor card 50 is a circuit 52 for selecting "a" signals from an output module 24 and a circuit 54 for selecting "b" signals from the output modules 54. The "a" signals allow an operator to observe any one output signal of the output modules 24 at the operator's discretion. The "b" signals are used to build a map of active outputs. The outputs from the switch 30 of an output module 24 are sequentially polled by circuit 54. Each output module 24 is then examined in the same way, in turn. A comparison circuit 56 is provided to compare the map built of active outputs with a map of expected active outputs. The map of expected active outputs is built from a user's programming of the router 20. If the map of active outputs does not match the map of expected active outputs, signal 60 can be used to prompt an operator to switch between a crosspoint module and a redundant crosspoint module. If the user has designated the output as always "on-air", then the output signal 60 can be used to automatically generate the necessary control signals for the output module logic block, 42 and the switch can be automatically made to the redundant crosspoint module 28.

Figure 5:
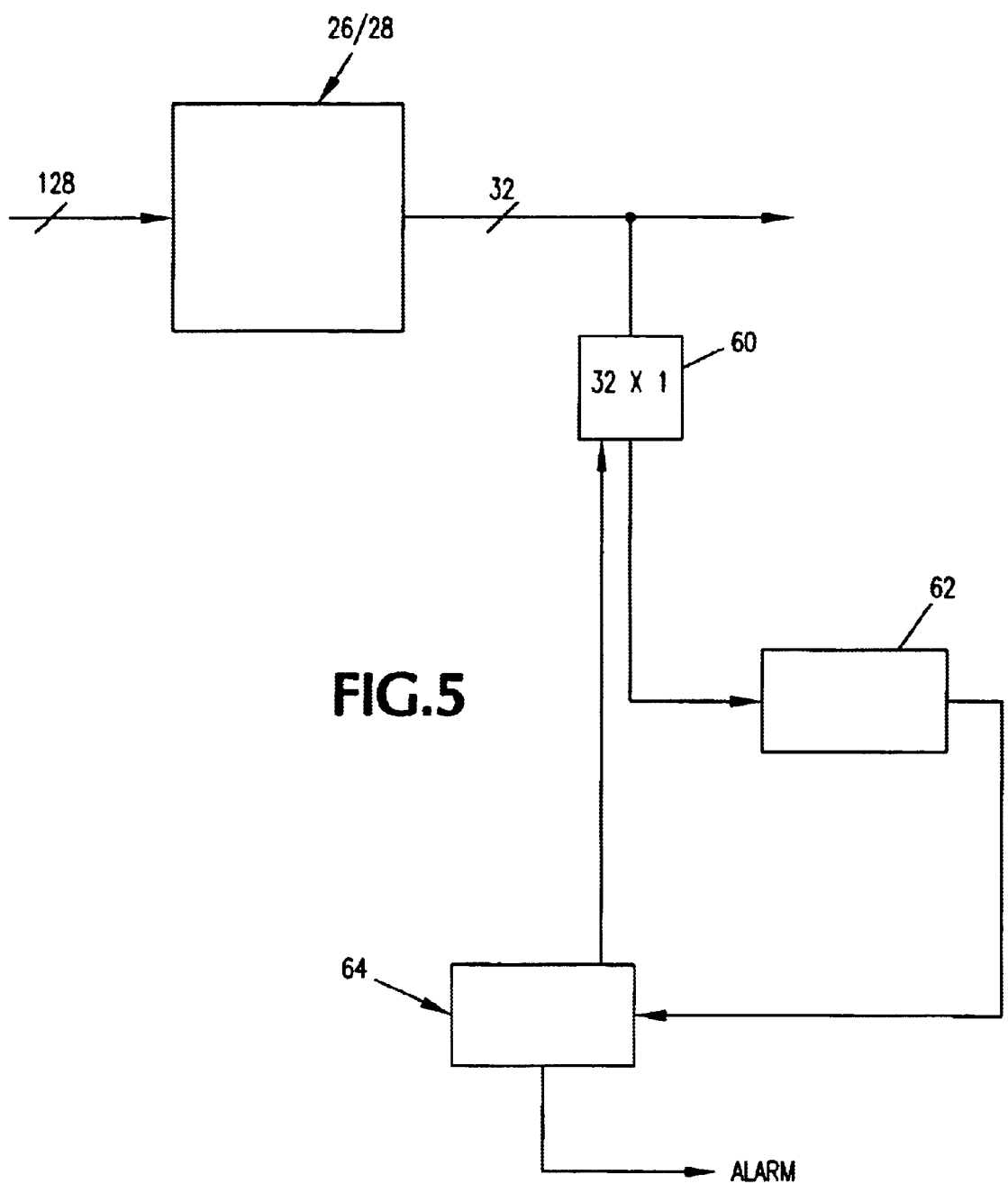
FIG. 5 is a schematic of a self-monitoring crosspoint module.

FIG. 5 is a schematic of a circuit for self-monitoring a crosspoint or redundant crosspoint module 26, 28. A switch 60 is coupled to the outputs of module 26, 28. A signal detection circuit 62 is coupled to the output of the switch 60. A state machine 64 is coupled to the output of the signal detection circuit 62 and the switch 60. A state machine 64 is coupled to the output of the signal detection circuit 62 and the switch 60. The state machine 64 polls each output of the crosspoint module sequentially through switch 60. The output is applied to signal detection circuit 62 which detects whether there is a signal. If there is not, circuit 62 causes state machine 64 to issue an alarm. As in the previous embodiment, the alarm can be sent to a quality control room to notify an operator, or, if the user has designated the output as "on-air", the switch can be made automatically.

Figure 6:
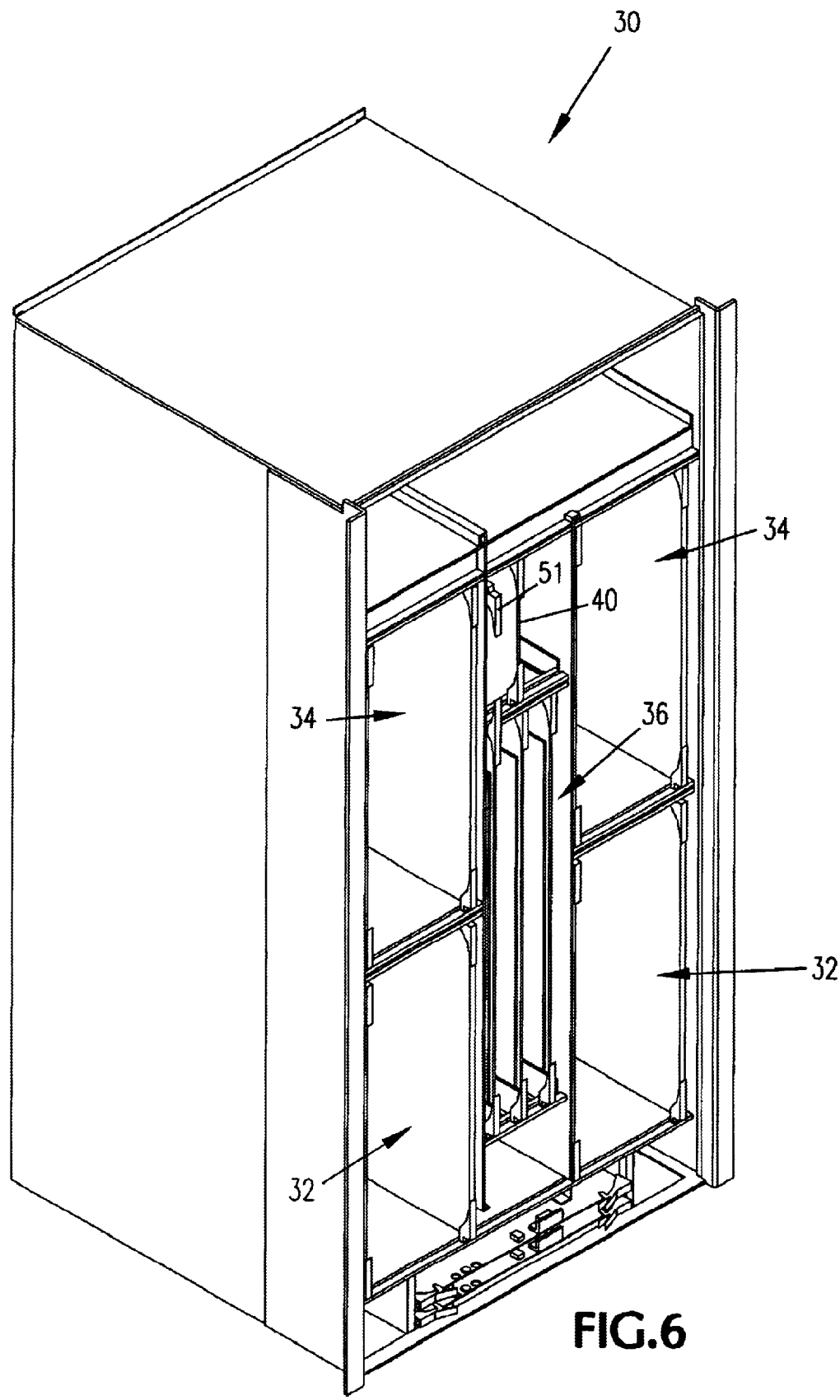
FIG. 6 is an elevational view of a chassis housing modules according to a preferred embodiment of the present invention.
Figure 7:
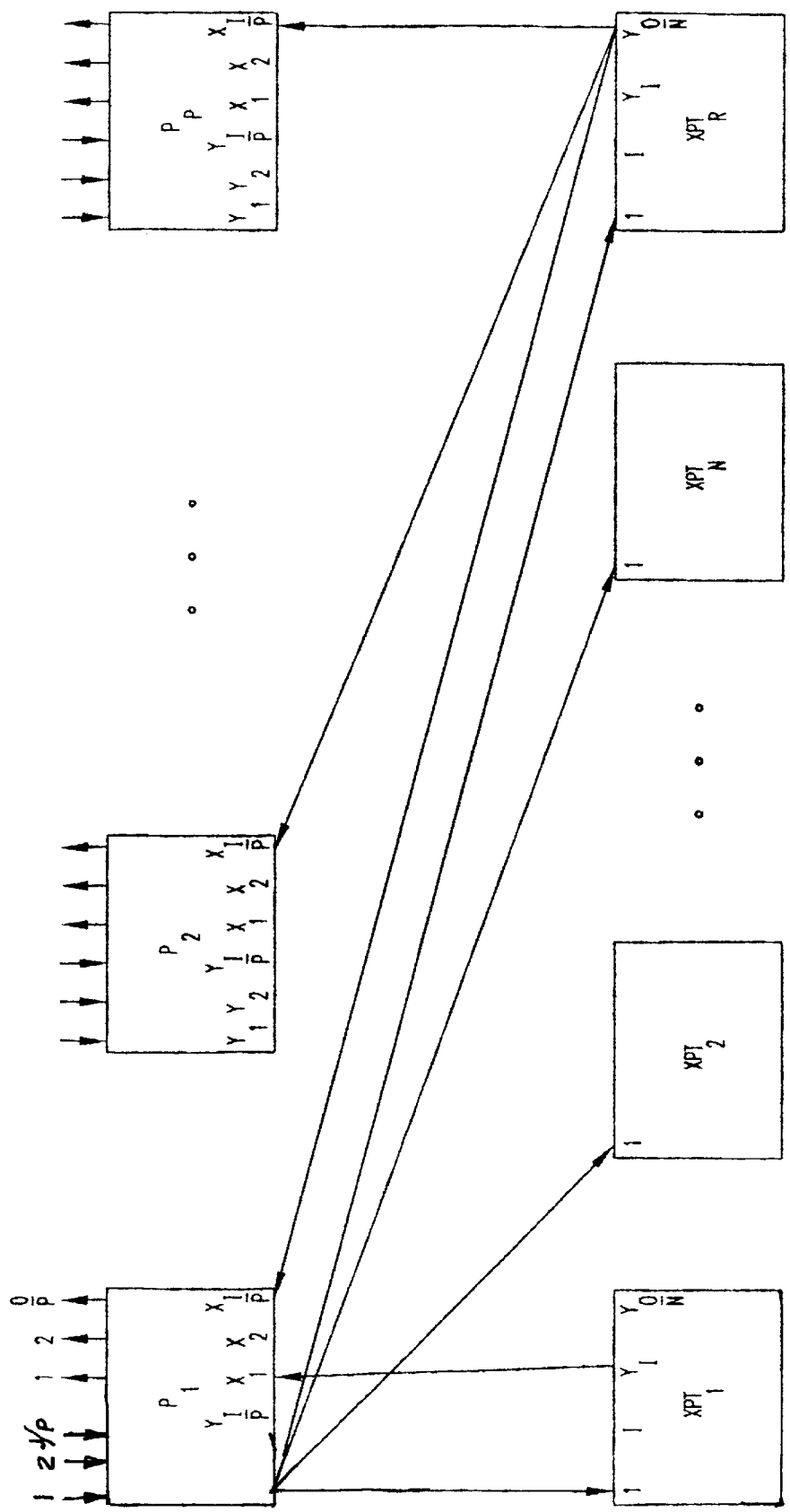
FIG. 7 is a schematic of a redundant router according to another preferred embodiment of the present invention.

FIG. 6 is a perspective view of the router 20 located in a chassis 30. The chassis 30 is divided into sections 32, 34, and 36 which will hold the various modules of the router 20. In a preferred embodiment, the input modules 22 are located in two lower corner sections 32, the output modules 24 are located in two upper corner sections 34, and the crosspoint and redundant crosspoint modules, 26, 28 are located in the middle section 36. The logic module 40 is located above middle section 36. The various modules are in the form of printed circuit boards which can be slid into the chassis 30 as is well known to those of ordinary skill in the art. This provides increased flexibility in design and also simple maintenance. When a crosspoint module fails, the redundant crosspoint module is swapped into place until the failed crosspoint is repaired or replaced. By designing appropriately the input and output modules, the failure impact of the router can be customized.

The crosspoint and redundant modules may be implemented with mechanical, electromechanical, electrical, electro-optical, and optical or other switching devices. The couplings between the crosspoint, redundant crosspoint module and the input/output modules is selected based on the type of switching employed which is well known to those of ordinary skill in the art.

Figure 8:
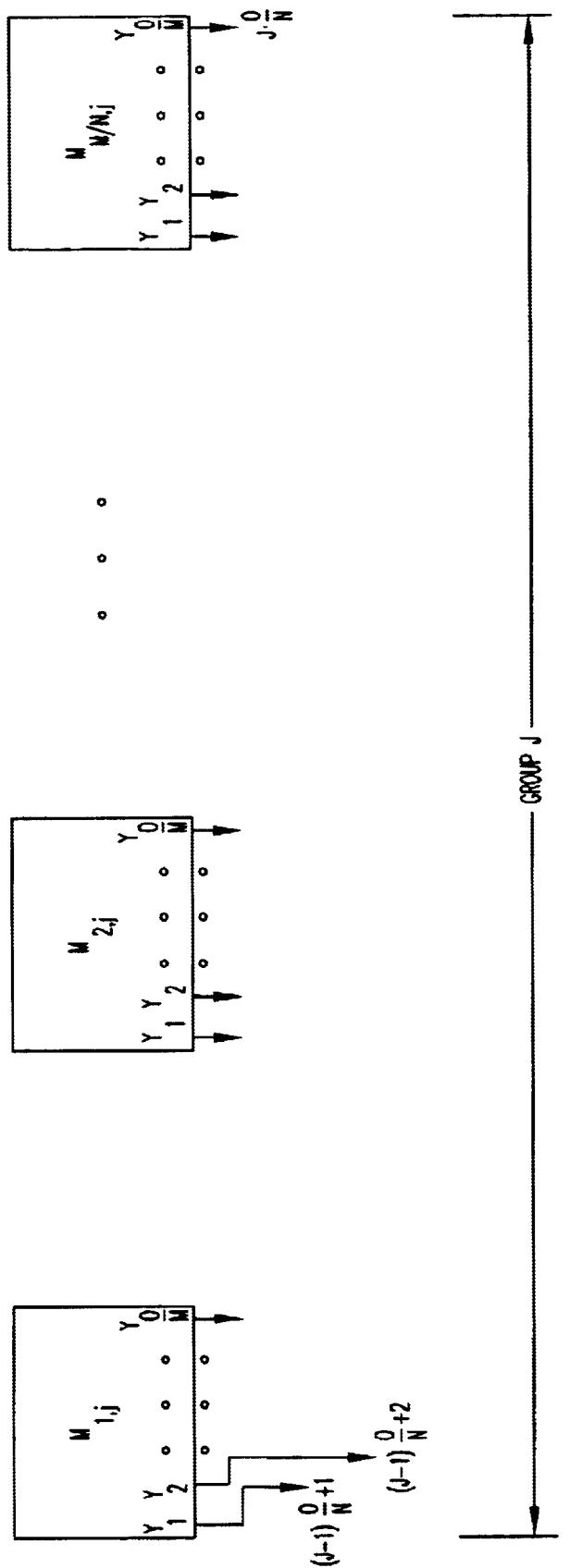
FIG. 8 is a schematic of a group of output modules and an associated numbering scheme according to a preferred embodiment of the present invention.

FIG. 8 is a schematic of an output numbering scheme for the jth group of N groups of M/N output modules according to a preferred embodiment of the invention.

The various embodiments described above are provided by way of illustration only and should not be construed to limit the invention. Those skilled in the art will readily recognize various modifications and changes which may be made to the present invention without strictly following the preferred embodiments illustrated and described herein, and without departing from the true spirit and scope of the present invention which is set forth in the following claims.

What is claimed is:

1. A router having I inputs and O outputs comprising:
P input modules wherein each input module receives I/P of I inputs;
N crosspoint modules wherein each crosspoint module receives I inputs and outputs O/N outputs per module;
a redundant crosspoint module which receives I inputs and outputs O/N outputs; and
M output modules wherein each output module receives O/M outputs per module from a particular N crosspoint module and a corresponding O/M output from the redundant module.

2. The router of claim 1 further comprising:
a detector for detecting whether a crosspoint module has failed; and
a switch for switching the output from the failed crosspoint to the redundant crosspoint.

3. The router of claim 2 wherein the detector is located on each output module.

4. The router of claim 3 wherein the detector comprises logic that examines a status line received from its respective crosspoint module and the redundant crosspoint module and switches to the redundant crosspoint module if the status of the redundant crosspoint module is good and the status of the respective crosspoint module is bad.

5. The router of claim 4 further comprising a reset button wherein once a switch has occurred from a crosspoint module to the redundant crosspoint module, no further switching can occur until the reset button is depressed.

6. The router of claim 5 further comprising logic that once the reset button is depressed, a switch does not occur until a vertical is detected.

7. The router of claim 1 further comprising O/M switches associated with each output module for selecting between an output from one of the N crosspoint modules and the redundant crosspoint module.

8. The router of claim 7 wherein the O/M switches of each module are controlled in common.

9. The router of claim 7 wherein once anyone of the O/M switches has selected the output from the redundant crosspoint module, a switch is made back to the associated crosspoint module only after a predetermined conditions detected in the switch strobe signal and the Nth crosspoint module status line is good.

10. The router of claim 9 wherein the predetermined condition is a video vertical interval.

11. A router having I inputs and O outputs, the router comprising:
N crosspoint modules, each crosspoint module having I inputs and O/N outputs;
P input modules, each input module having I/P inputs and I/P outputs wherein each output of each input module is coupled to a unique input of each of N crosspoint modules so that an input received by any of P input modules is propagated to each of N crosspoint modules;
M output modules, each output module having a first set of O/M inputs, and a second set of O/M inputs and O/M outputs wherein the M output modules are arranged in N groups of M/N output modules and wherein the outputs of each of the N crosspoint modules is coupled in a one-to-one, known order to the first set of O/M inputs of the M/N output modules of a unique one of the N groups of output modules; and
a redundant crosspoint module having I inputs coupled in a one-to-one manner to the I/P outputs of each of the P input modules, the redundant crosspoint module having O/N outputs coupled to the second set of O/M inputs of the M/N output modules 10 of each of the N groups of output modules in a one-to-one, known order wherein the order of the connections between the outputs of the redundant crosspoint module within a particular group are identical to the connection between that particular group and its associated one of N crosspoint modules so that each group of output modules receives an output from one of the N crosspoint modules and an output from the redundant module.

12. The router of claim 11 further comprising O/M switches associated with each output module for selecting between an output from one of the N crosspoint modules and the redundant crosspoint module.

13. The router of claim 12 wherein the O/M switches of each module are controlled in common.

14. The router of claim 12 wherein once anyone of the O/M switches has selected the output from the redundant crosspoint module, a switch is made back to the associated crosspoint module only after a predetermined condition is detected in the switch strobe signal and the Nth crosspoint module status line is good.

15. The router of claim 14 wherein the predetermined condition is a video vertical interval.

16. The router of claim 12 further comprising logic located on each output module that examines a status line received from the output module's respective crosspoint module and the redundant module and, if the status of the redundant module is good and the status of the respective crosspoint module is bad, the logic outputs a control signal to the O/M switches of the output module to switch to the redundant crosspoint module.

17. The router of claim 16 further comprising a reset button coupled to the logic wherein once a switch has occurred from either first or second crosspoint module to the redundant crosspoint module no further switching occurs until the reset button is depressed.

18. The router of claim 16 wherein the logic located on each output module examines the status line received from each of the crosspoint modules and the first crosspoint module that has a bad status is swapped with the redundant crosspoint controller and the remaining crosspoint modules are locked out from being swapped with e redundant crosspoint controller even if their status is bad.

19. The router of claim 11 wherein I=256, O=256 and N=2.

20. A router having I inputs and O outputs, the router comprising:
N crosspoint modules;
a redundant crosspoint module; and
P port modules each port module receives I/P inputs and propagates said inputs identically to corresponding inputs on each of N crosspoint modules and redundant crosspoint module and each port module receives O/P unique inputs from one of N crosspoint modules in a known order, and also receives O/P inputs identically with N−1 other port modules from the redundant crosspoint module in an identical known order.

21. The router of claim 20 further comprising a detector located on the port modules for detecting when to switch outputs to the port module from the port module's respective crosspoint module to the redundant crosspoint module.

22. The router of claim 21 wherein the detector includes logic that examines a status line received from its respective N crosspoint module and the redundant module and switches to the redundant module if the status of the redundant module is good and the status of the respective N crosspoint module is bad.

23. The router of claim 20 further comprising O/P switches on the port modules that select between either the O/P crosspoint inputs or the O/P redundant crosspoint inputs at the port module's respective O/P outputs.

24. A method of providing redundancy to a router having I inputs and O outputs, the method comprising the steps of:
  (a) detecting a failure in a crosspoint module supplying an output to an output module;
  (b) switching between an output provided to the output module from the crosspoint detected in step (a) to a redundant crosspoint module, wherein the redundant crosspoint module is coupled to the output module in an identical order to that of the crosspoint module detected in step (a);
  (c) detecting a condition to switch back to the crosspoint detected in step (a); and
  (d) switching back to the crosspoint detected in step (a) only after a first condition is detected by the router.

25. The method of claim 24 wherein the first condition is a video vertical interval.

26. The method of claim 24 wherein step (c) includes a step of detecting the activation of a reset switch.

27. The method of claim 24 wherein step (d) further includes a step of detecting a second condition before a switch back is made.

28. The method of claim 27 wherein the step of detecting a second condition includes monitoring a status line from the crosspoint detected in step (a).

29. A method of providing redundancy to a router having I inputs and O outputs, the method comprising the steps of:
  (a) monitoring a status of every crosspoint module in the router;
  (b) detecting a failure in one of the crosspoint module supplying an output to an output module;
  (c) switching between an output provided to the output module from the crosspoint detected in step (b) to a redundant crosspoint module, wherein the redundant crosspoint module is coupled to the output module in an identical order to that of the crosspoint module detected in step (b);
  (d) detecting a condition to switch back to the crosspoint detected in step (b);
  (e) switching back to the crosspoint detected in step (b) only after a first condition is detected by the router;
  (f) ignoring any subsequent failure in any of the crosspoint modules after step (a) until step (e) is performed.

* * * * *